(12) United States Patent
Maeda et al.

(10) Patent No.: US 10,764,412 B2
(45) Date of Patent: Sep. 1, 2020

(54) NETWORK RELAY DEVICE, NETWORK RELAY METHOD, AND NETWORK RELAY PROGRAM

(71) Applicant: HITACHI, LTD., Tokyo (JP)

(72) Inventors: Kazuhiro Maeda, Tokyo (JP); Yoji Ozawa, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 16/444,760

(22) Filed: Jun. 18, 2019

(65) Prior Publication Data

US 2020/0045149 A1    Feb. 6, 2020

(30) Foreign Application Priority Data

Aug. 1, 2018    (JP) ................ 2018-145431

(51) Int. Cl.
    *H04L 29/08*    (2006.01)
    *H04L 12/437*   (2006.01)
    *H04L 29/06*    (2006.01)
    *H04L 12/46*    (2006.01)

(52) U.S. Cl.
    CPC .......... *H04L 69/321* (2013.01); *H04L 12/437* (2013.01); *H04L 12/4633* (2013.01); *H04L 69/22* (2013.01); *H04L 69/324* (2013.01); *H04L 69/325* (2013.01)

(58) Field of Classification Search
    CPC ... H04L 41/06; H04L 12/462; H04L 12/4633; H04L 69/22; H04L 69/40; H04L 69/324; H04L 69/325; H04L 12/437; H04L 69/321; H04L 2012/4629
    See application file for complete search history.

(56) References Cited

U.S. PATENT DOCUMENTS

| 9,385,942 B2* | 7/2016 | Grosser, Jr. ............ H04L 41/12 |
| 2008/0170494 A1* | 7/2008 | Enoki .................... H04L 45/00 370/221 |
| 2011/0010769 A1* | 1/2011 | Jarredal .............. H04L 63/0236 726/13 |
| 2012/0044813 A1* | 2/2012 | Nandagopal ........... H04L 45/28 370/242 |
| 2012/0127854 A1* | 5/2012 | Khetan ................. H04L 45/00 370/218 |

(Continued)

OTHER PUBLICATIONS

Pan et al. : "RFC4090: Fast Reroute Extensions to RSVP-TE for LSP Tunnels". May 2005: p. 38.

*Primary Examiner* — Michael Won
*Assistant Examiner* — Muhammad Raza
(74) *Attorney, Agent, or Firm* — Volpe and Koenig, P.C.

(57) ABSTRACT

A communication disabled time during a network failure can be shortened. An SW1 capable of generating a layer 3 packet from a received layer 2 frame and transmitting the generated layer 3 packet includes: a plurality of ports 200 which is capable of transmitting and receiving data; a layer 2 ring processing unit 203 which detects a failure of a network 3 connected via the ports 200; and a VXLAN processing unit 4 which generates a plurality of layer 3 packets from one layer 2 frame received via the ports 200 when the failure of the network 3 is detected by the layer 2 ring processing unit 203, and transmits the generated plurality of layer 3 packets to a network via the plurality of ports 200.

4 Claims, 14 Drawing Sheets

(56) References Cited

U.S. PATENT DOCUMENTS

2012/0317138 A1* 12/2012 Kitaichi ............... H04L 12/437
707/769
2015/0334057 A1* 11/2015 Gao ..................... H04L 49/557
370/392
2017/0214549 A1* 7/2017 Yoshino ............. H04L 12/4641

* cited by examiner

FIG. 1A
1000
FIG. 1B
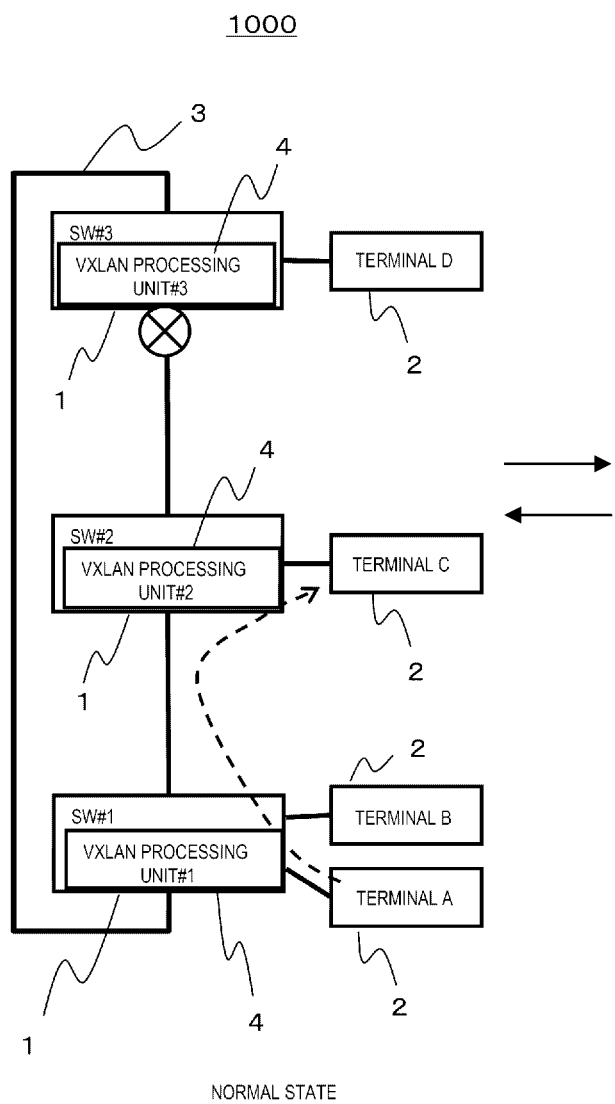
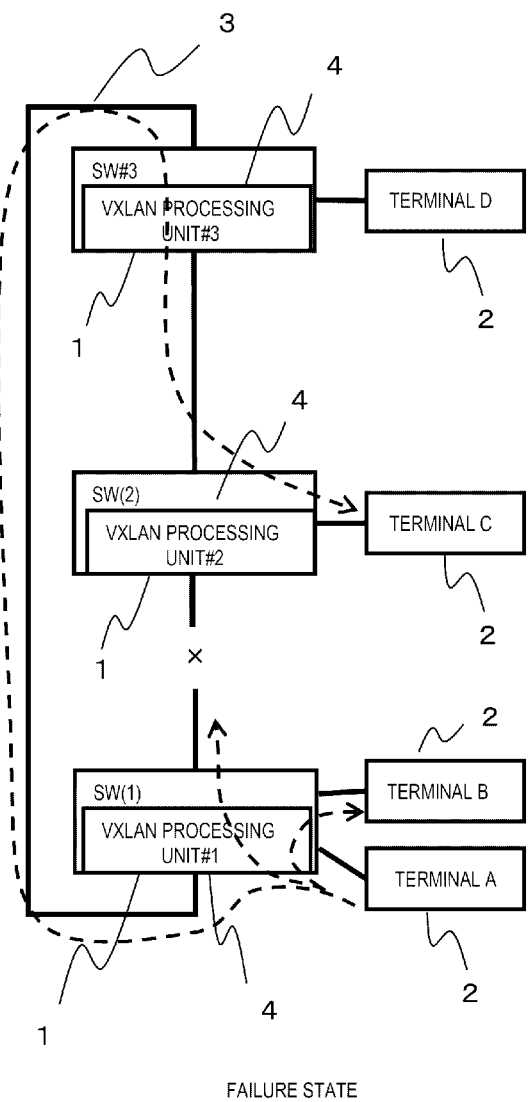
NORMAL STATE
FAILURE STATE

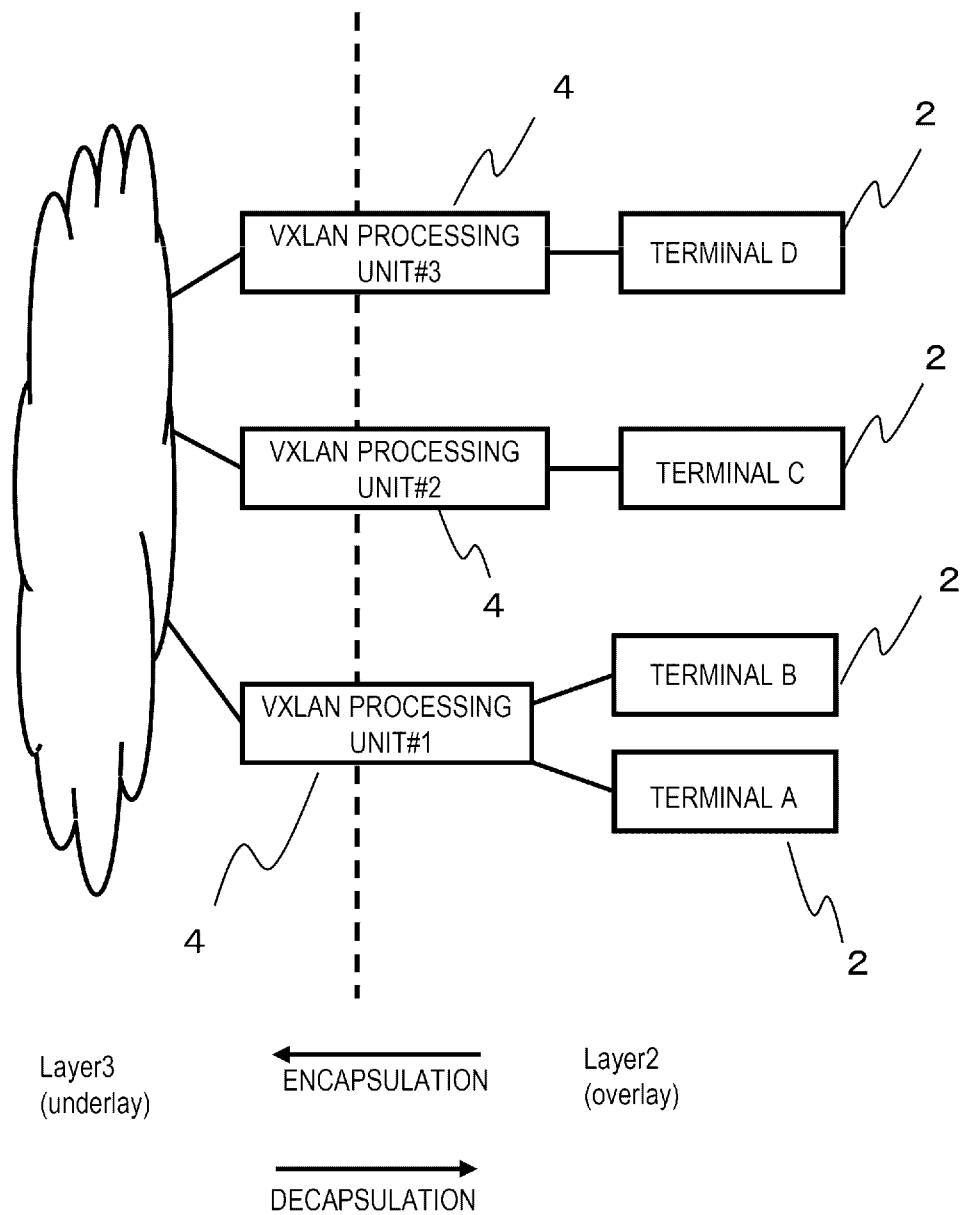

NORMAL STATE

FAILURE STATE

FIG. 9

| VNI | REPLICATION ID |
|---|---|
| VNI1 | id1 |
| VNI2 | id2 |
| : | : |

| VNI | NORMAL TIME REPLICATION ID | FAILURE TIME REPLICATION ID |
|---|---|---|
| VNI1 | id1 | id3 |
| VNI2 | id2 | id4 |
| : | : | : |

| REPLICATION ID | DESTINATION IP ADDRESS | DESTINATION MAC ADDRESS | OUTPUT PORT |
|---|---|---|---|
| id1 | IP2 | MAC2 | port2 |
| | IP3 | MAC3 | port1 |
| | - | - | port3 |
| | - | - | port4 |
| id2 | IP2 | MAC2 | port2 |
| | IP3 | MAC3 | port1 |
| | - | - | port3 |
| | - | - | port4 |
| ⋮ | ⋮ | ⋮ | ⋮ |
| id3 | IP2 | MAC2 | port2 |
| | IP3 | MAC3 | port1 |
| | - | - | port3 |
| | - | - | port4 |
| | IP2 | MAC2 | port1 |
| | IP3 | MAC3 | port2 |
| id4 | IP2 | MAC2 | port2 |
| | IP3 | MAC3 | port1 |
| | - | - | port3 |
| | - | - | port4 |
| | IP2 | MAC2 | port1 |
| | IP3 | MAC3 | port2 |
| ⋮ | ⋮ | ⋮ | ⋮ |

213a 213b 213c 213d 213

NETWORK RELAY DEVICE, NETWORK RELAY METHOD, AND NETWORK RELAY PROGRAM

BACKGROUND OF THE INVENTION

1. Field of the Invention

The present invention relates to a technique for relaying data in a communication network.

2. Description of the Related Art

In a communication network, there is a problem that communication cannot be performed when a cable is broken or a device failure occurs. Therefore, in a layer 2 (layer in an OSI reference model) network, a spanning tree (defined in IEEE802.1D) is used which eliminates a loop configuration by providing a blocking port logically without depending on a network topology such as a mesh topology or a ring topology, and recovers communication by opening the blocking port when a failure occurs.

By limiting the topology to a ring, each network device vendor independently formulates a specification for a ring protocol which speeds up fault detection and fault recovery. As such a ring protocol, for example, an ALAXALA ring protocol is known.

In a layer 3 which operates based on the layer 2, since a path of the layer 3 is switched after a path of the layer 2 is switched, there is a problem that it takes time for the switching of the path of layer 3. Therefore, there is a technique for speeding up the switching time by searching for a switching path in advance for each failure location and setting a path searched in advance when the failure occurs (see, for example, RFC4090: Fast Reroute Extensions to RSVP-TE for LSP Tunnels (Non-Patent Literature 1)).

SUMMARY OF THE INVENTION

By using the technique in Non-Patent Literature 1, speeding up of the path switching can be achieved, but when there are many switching targets, or when it takes time to set the switching itself, it takes a lot of time to complete switching and enable communication. In addition, it is necessary to search for the switching path in advance, and the load of the processing in advance is large.

The invention is made in view of the above circumstances, an object of the invention is to provide a technique which can shorten a communication disabled time during a network failure.

In order to achieve the above object, a network relay device according to one aspect relates to a network relay device capable of generating a layer 3 packet from a received layer 2 frame and transmitting the generated layer 3 packet, the network relay device including: a plurality of ports which is capable of transmitting and receiving data; a detection unit which detects a failure of a network connected via the ports; and a transmission processing unit which generates a plurality of layer 3 packets from one layer 2 frame received via the port when the failure of the network is detected by the detection unit, and transmits the generated plurality of layer 3 packets to a network via the plurality of ports.

According to the invention, the communication disabled time during the network failure can be shortened.

BRIEF DESCRIPTION OF THE DRAWINGS

FIGS. 1A and 1B are diagrams illustrating an entire configuration of a network system and states of the network system according to an embodiment.

FIG. 2 is a diagram illustrating a concept of VXLAN communication according to the embodiment.

FIG. 9 is a configuration diagram of an example of a replication ID table according to the embodiment.

FIG. 10 is a configuration diagram of an example of a replication switching registration table according to the embodiment.

FIG. 11 is a configuration diagram of an example of an unlearned encapsulation table according to the embodiment.

DESCRIPTION OF EMBODIMENTS

Figure 3:
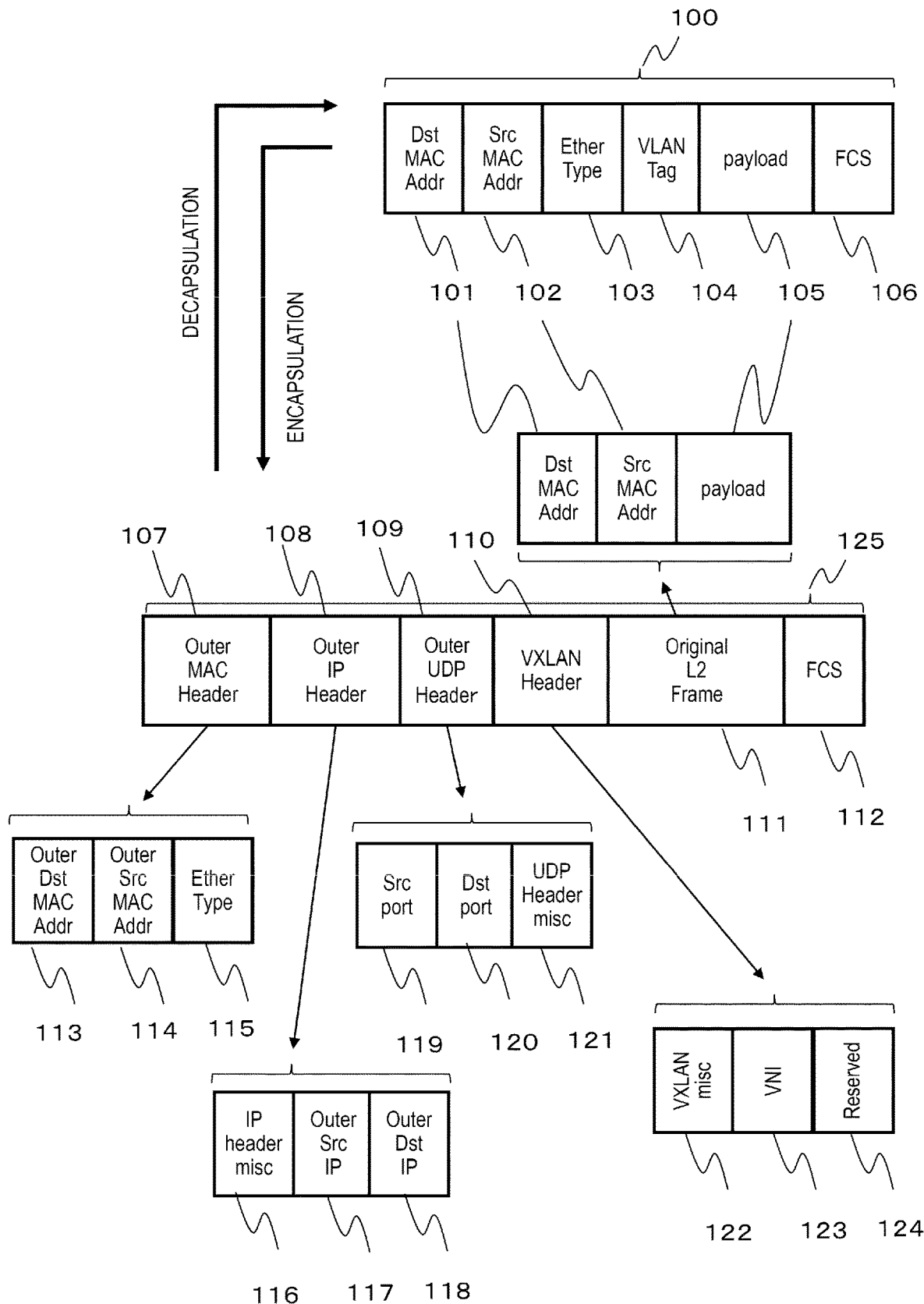
FIG. 3 is a diagram illustrating a format of a frame and a packet related to the VXLAN according to the embodiment.

An embodiment will be described with reference to the drawings. The embodiment described below does not limit the invention according to the claims, and all of the elements described in the embodiment and their combinations are not essential to the solution of the invention.

In the following description, information may be described by the expression "AAA table", but the information may be expressed by any data structure. That is, the "AAA table" may be referred to as "AAA information" to indicate that the information does not depend on the data structure.

In the following description, when the elements of the same type are described without distinction, the reference numerals (or common parts in the reference numerals) are used, and when the elements of the same type are described separately, the ID of the element (or the reference numeral of the element) may be used.

FIGS. 1A and 1B are diagrams illustrating an entire configuration of a network system and states of the network system according to an embodiment.

A network system 1000 has a ring topology in which a plurality of (for example, three in FIGS. 1A and 1B) network switches 1 (SW: switches) are connected in a ring shape. SW1 is an example of a network relay device. In the network system 1000, a layer 2 ring protocol is operating. In a layer 2 network, broadcast, unknown unicast, and multicast (BUM) frames are replicated and relayed to all ports because a transmission destination is not uniquely determined. Therefore, when a loop network is configured, a frame is continuously relayed permanently in the loop. In the present embodiment, a ring protocol logically blocks communication to ensure redundancy of a communication path, while logically eliminating the formation of the loop. Although the ring protocol is used in the present embodiment as an example, a spanning tree protocol (STP) may also be used. While the STP and the ring protocol are common in logically blocking communication, there are also differences. In the STP, various topologies such as a mesh topology and a ring topology can be configured, but in the ring protocol, only the ring topology can be configured. In addition, the STP takes a long time to switch paths because there can be a complex topology. Meanwhile, since the ring protocol simplifies the topology, the path switching is faster than in the STP.

A network 3 in the network system 1000 has a ring topology configuration in which three SW1s (SW#1, SW#2, and SW#3) are connected in a ring shape. One or more terminals 2 can be connected to the SW1. The terminal A and the terminal B are connected to the SW#1, the terminal C is connected to the SW#2, and the terminal D is connected to the SW#3. Each terminal 2 performs communication via the SW1.

In the present embodiment, the SW#3 is set as a master node. The master node is a device which is a center of ring protocol control. The SW1 (SW#1, SW#2) other than the master node in the SW1 which configures the ring topology is referred to as a transit node.

Two ports of the SW1 which configures the ring topology are referred to as ring ports. Particularly, two ring ports of the master node are referred to as a primary port and a secondary port. Here, for example, a port with a small port number automatically serves as the primary port. In addition, the secondary port is a blocking port which logically blocks communication at a normal time.

In the network system 1000, by connecting a port1 (upper side in the drawing) of the SW#1 and a port2 (lower side in the drawing) of the SW#2, connecting a port1 of the SW#2 and a port2 of the SW#3, and connecting a port1 of the SW#3 and a port2 of the SW#1, the network 3 having a ring topology is configured.

In the network system 1000, as illustrated in FIG. 1A, in a normal state where no network failure occurs, the port2 of the SW#3, which is the master node, is a blocking port, and a normal frame which enters the port2 of the SW#3 is discarded. In addition, in the network system 1000, as illustrated in FIG. 1B, for example, at a network failure time when a cable between the SW#1 and the SW#2 is broken, the port2 of the SW#3 is changed from the blocking port to a normal port for frame relay.

The master node (SW#3) transmits and receives a health check frame. The health check frame is a frame for checking whether there is no broken part in the ring or whether the network switch 1 cannot be relayed due to the failure. When receiving the health check frame on the ring port, the transit node (SW#1, SW#2) transmits the health check frame to another ring port which is a ring port having not received the health check frame. Accordingly, when the network failure does not occur, the health check frame transmitted by the master node (SW#3) returns to the master node via each transit node. Accordingly, the master node can grasp whether the network failure occurs.

Next, virtual eXtensible local area network (VXLAN) communication performed in the network system 1000 will be described.

FIG. 2 is a diagram illustrating a concept of the VXLAN communication according to the embodiment.

In the network system 1000, the VXLAN communication in which the internet engineering task force (IETF) releases the specification as RFC7348 is realized. VXLAN is a technique for virtually constructing the layer 2 network on a layer 3 network by encapsulating a layer 2 frame 100 (see FIG. 3) to a layer 3 packet. A VXLAN processing unit 4 provided in the SW1 is a terminal of the VXLAN. The layer 2 frame 100 is encapsulated to a VXLAN packet 125 (see FIG. 3, layer 3 packet), and the VXLAN packet 125 is decapsulated to the layer 2 frame 100.

Next, a frame (layer 2 frame 100) and a packet (VXLAN packet 125) related to the VXLAN will be described.

FIG. 3 is a diagram illustrating a format of a frame and a packet related to the VXLAN according to the embodiment.

The VXLAN packet 125 illustrated in FIG. 3 is a VXLAN packet defined by the RFC7348.

The layer 2 frame 100 includes a destination MAC address (Dst MAC Addr) 101, a transmission source MAC address (Src MAC Addr) 102, a protocol type (Ether Type) 103, a VLAN Tag 104, a payload 105, and an FCS 106. The destination MAC address 101 is a MAC address of a device as a transmission source of the frame. The transmission source MAC address 102 is a MAC address of a transmission destination device of the frame. The protocol type 103 is information which indicates the type of the protocol to which the frame corresponds, and is "0x8100" in the example of FIG. 3. The VLAN Tag 104 is a Tag of a VLAN. The payload 105 is user data to be transmitted. The FCS 106 is a frame check sequence (FCS) which indicates a terminal of the frame.

The VXLAN packet 125 includes an Outer MAC Header 107, an Outer IP Header 108, an Outer UDP Header 109, a VXLAN Header 110, an Original L2 Frame 111, and an FCS 112. The Outer MAC Header 107 includes a destination MAC address (Outer Dst MAC Addr) 113, a transmission source MAC address (Outer Src MAC Addr) 114, and a protocol type (Ether Type) 115. The Outer IP Header 108 includes an IP header (IP header misc) 116, a transmission source IP address (Outer Src IP) 117, and a destination IP address (Outer Dst IP) 118. The VXLAN Header 110 includes a VNI (VXLAN network identifier) 123 corresponding to the ID of the VXLAN, a reserved bit (Reserved) 124, and another identifier (VXLAN misc) 122. The Original L2 Frame 111 includes a destination MAC address 101 (Dst MAC Addr), a transmission source MAC address 102 (Src MAC Addr), and a payload 105. The destination MAC address 101, the transmission source MAC address 102, and the payload 105 correspond to the contents of the layer 2 frame 100 before encapsulation or after decapsulation.

Next, the functional configuration of the SW1 will be described in detail.

Figure 4:
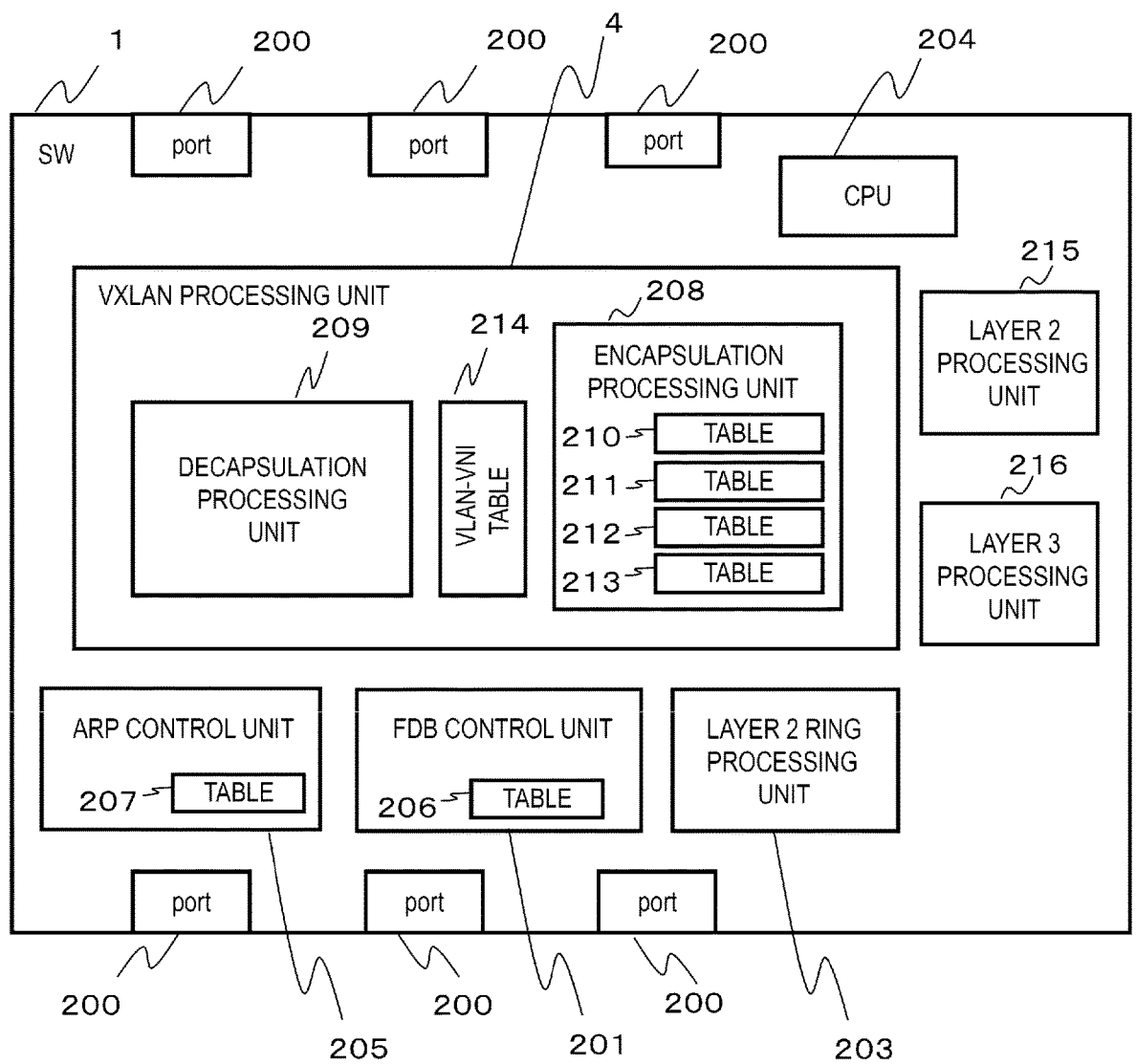
FIG. 4 is a functional configuration diagram of a network switch according to the embodiment.

FIG. 4 is a functional configuration diagram of the network switch according to the embodiment.

The SW1 includes two or more ports 200, a forwarding database (FDB) control unit 201, a VXLAN processing unit 4 as an example of a transmission processing unit, a layer 2 ring processing unit 203 as an example of a detection unit, a CPU 204, an address resolution protocol (ARP) control unit 205, a layer 2 processing unit 215, and a layer 3 processing unit 216.

The FDB control unit 201 stores a FDB table 206 and controls a transfer destination according to the destination MAC address. The ARP control unit 205 stores an ARP table 207, and transmits and receives an ARP to register, update, and delete the ARP table 207. The layer 2 ring processing unit 203 controls a layer 2 ring protocol. Specifically, the layer 2 ring processing unit 203 transmits and receives a health check frame, a failure notification frame, and a recovery notification frame. The VXLAN processing unit 4 includes a VLAN-VNI table 214, an encapsulation processing unit 208 as an example of a path information learning unit and an address learning unit, and a decapsulation processing unit 209. The encapsulation processing unit 208 stores a learned encapsulation table 210, a replication ID table 211, a replication switching registration table 212, and an unlearned encapsulation table 213, and performs an encapsulation processing to convert the layer 2 frame 100 into the VXLAN packet 125. The decapsulation processing unit 209 performs a decapsulation processing to convert the VXLAN packet 125 into the layer 2 frame 100. The VLAN-VNI table 214 is a table for managing a mapping between a VNI of the VXLAN and a VLANID. The layer 2 processing unit 215 performs processing such as relaying of the layer 2 frame according to the layer 2. The layer 3 processing unit 216 performs processing such as relaying of the VXLAN packet 125 according to the layer 3. The CPU 204 controls the entire SW1.

Figure 5A:
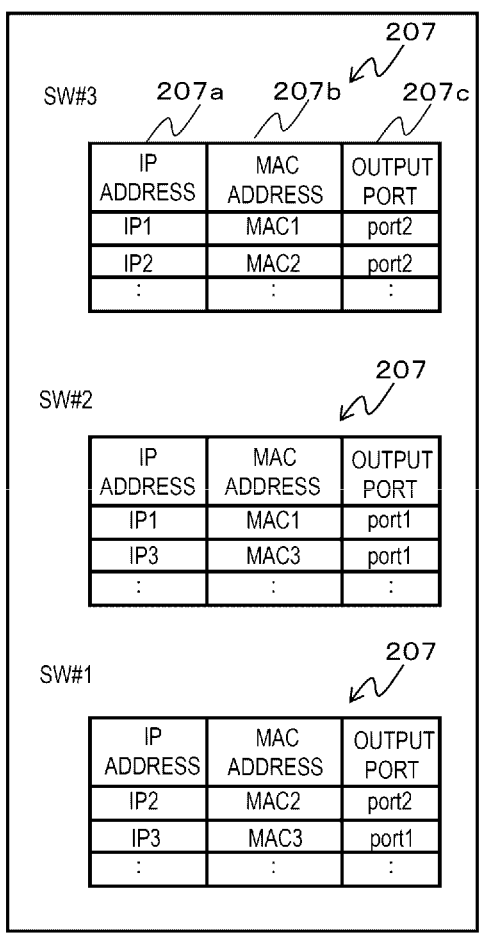
FIGS. 5A and 5B are configuration diagrams of an example of an ARP table according to the embodiment.
Figure 5B:
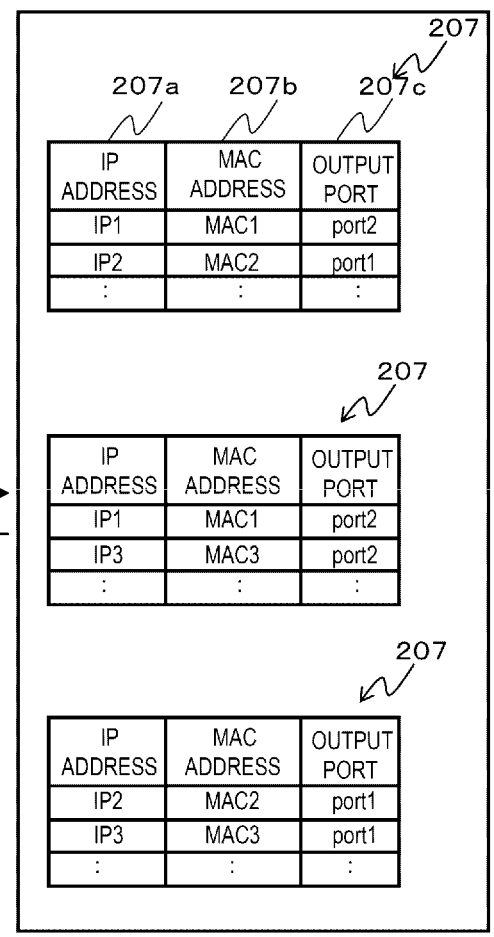

FIGS. 5A and 5B are configuration diagrams of an example of the ARP table according to the embodiment.

Here, an IP address is assigned to each VXLAN processing unit 4 provided in each SW1 of the network system 1000 illustrated in FIGS. 1A and 1B. In addition, an IP address of a VXLAN processing unit #1 of the SW#1 will be described as IP1, and the MAC address thereof will be described as MAC1. An IP address of the VXLAN processing unit #2 of the SW#2 will be described as IP2, and the MAC address thereof will be described as MAC2. An IP address of the VXLAN processing unit #3 of the SW#3 will be described as IP3, and the MAC address thereof will be described as MAG3. The IP addresses are IP1, IP2 and IP3 for convenience, but specifically, in the case of IPv4, the notation is 192.168.1.1.

FIG. 5A illustrates the ARP table 207 of each SW1 when the network system 1000 is in the normal state illustrated in FIG. 1A. FIG. 5B illustrates the ARP table 207 of each SW1 when the network system 1000 is in the failure state illustrated in FIG. 1B, and an ARP re-resolution is performed and updated after the failure occurs.

The ARP table 207 includes columns of an IP address 207a, a MAC address 207b, and an output port 207c. The IP address 207a stores an IP address of the SW1 as a relay destination. The MAC address 207b stores a MAC address of a destination device. The output port 207c stores an ID (identifier) of the port 200 used for communication to the destination.

When the network system 1000 is in the normal state illustrated in FIG. 1A, according to the ARP table 207 of the SW#1 illustrated in FIG. 5A, it indicates that the destination MAC address may be output from the port2 as the MAC2 in the case of relaying to the IP2 in the SW#1.

In addition, when the network system 1000 is in the failure state illustrated in FIG. 1B, according to the ARP table 207 of the SW#1 illustrated in FIG. 5B, it indicates that the destination MAC address may be output from the port1 as the MAC2 in the case of relaying to the IP2 in the SW#1. The operation of the ARP and the creation of the ARP table 207 are defined by RFC826.

Figure 6:
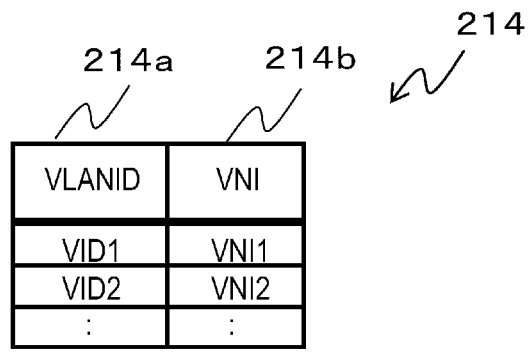
FIG. 6 is a configuration diagram of an example of a VLAN-VNI table according to the embodiment.

FIG. 6 is a configuration diagram of an example of the VLAN-VNI table according to the embodiment.

The VLAN-VNI table 214 is a table used to map a VLANID of the layer 2 to the VNI of the VXLAN when encapsulation and decapsulation of the VXLAN is performed, and includes a VLANID 214a and a VNI 214b in a column. The VLANID 214a stores the VLANID. The VNI 214b stores a VNI corresponding to the VLANID of the same row (entry). In the example of FIG. 6, when the VLANID is "VID1", the VNI is "VNI1", and when the VLANID is "VID2", the VNI is "VNI2". The VLAN-VNI table 214 is registered, for example, by the administrator of the SW1.

Figure 7:
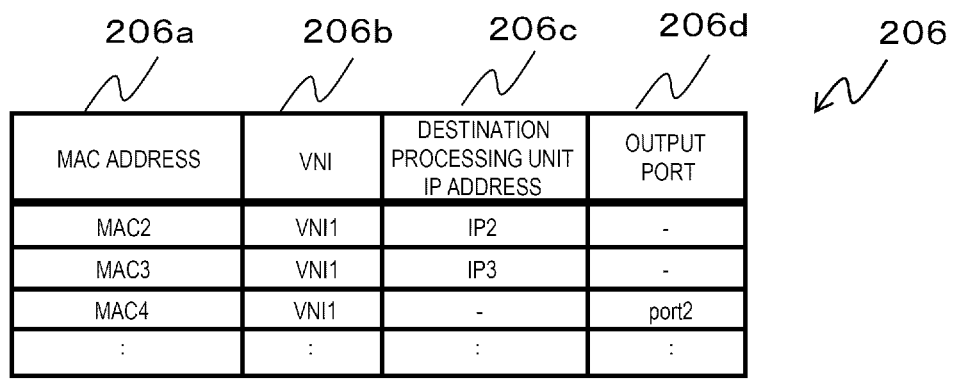
FIG. 7 is a configuration diagram of an example of an FDB table according to the embodiment.

FIG. 7 is a configuration diagram of an example of the FDB table according to the embodiment.

The FDB table 206 includes columns of a MAC address 206a, a VNI 206b, a destination processing unit IP address 206c, and an output port 206d. The MAC address 206a stores a MAC address of a device to be communicated. The VNI 206b stores the VNI corresponding to the VLAN to which the device of the same row (entry) belongs. The destination processing unit IP address 206c stores an IP address of the VXLAN processing unit 4 as a destination. The output port 206d stores an ID of a port to be used when communicating with a device in the same row. For example, in layer 2 frame relaying, when the destination MAC address is registered in the FDB table 206, it is transmitted toward the registered reception port, while when the destination MAC address is not registered (when it is unlearned), it is transmitted to a bi-directional port of the ring port. The FDB table 206 corresponds to transmission destination address information.

Figure 8:
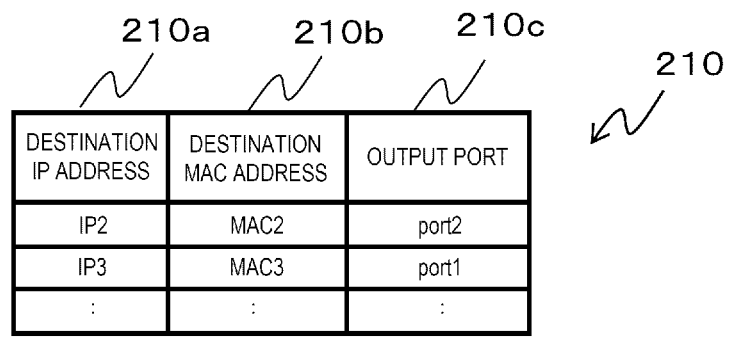
FIG. 8 is a configuration diagram of an example of a learned encapsulation table according to the embodiment.

FIG. 8 is a configuration diagram of an example of the learned encapsulation table according to the embodiment.

The learned encapsulation table 210 is a table (unicast encapsulation table) which is referred to when performing a learned unicast encapsulation, and includes columns of a destination IP address 210a, a destination MAC address 210b, and an output port 210c. The destination IP address 210a stores an IP address (destination IP address) of a destination device. A destination IP address of the destination IP address 210a is registered when the administrator of the SW1 registers connection (tunnel) information between the VXLAN processing units 4. The example of FIG. 8 illustrates the learned encapsulation table 210 in the VXLAN processing unit #1 of the SW#1. It illustrates a state where the administrator registers to connect with the IP address (IP2) of the VXLAN processing unit #2 and the IP address (IP3) of the VXLAN processing unit #3. The destination MAC address 210b stores the MAC address corresponding to the destination IP address of the device in the same row. The output port 210c stores the ID of the port to be used when outputting to the device in the same row. For example, after the administrator registers the destination IP address in the destination IP address 210a of the learned encapsulation table 210, the VXLAN processing unit 4 searches for the ARP table 207 using the destination IP address, and registers the obtained searched result (MAC address and output port) in the destination MAC address 210b and the output port 210c. In addition, the VXLAN processing unit 4 updates the learned encapsulation table 210 also at the timing when the ARP table 207 is updated. An entry of the learned encapsulation table 210 is an example of layer 3 packet path information.

FIG. 9 is a configuration diagram of an example of the replication ID table according to the embodiment.

The replication ID table 211 is a table which is referred to when the layer 2 frame 100 is received, and stores information which specifies a replication for each VNI. The replication ID table 211 includes columns of a VNI 211a and a replication ID 211b. The VNI 211a stores a VNI related to the SW1. The replication ID 211b stores an ID (replication ID) which indicates a replication during relaying in the VXLAN indicated by the VNI in the same row. The same value as a value of the VNI 214b is registered in the VNI 211a based on the registration of the VNI in the VNI 214b of the VLAN-VNI table 214 by the administrator of the SW1, and at the same time, the replication ID is stored in the replication ID 211b. The replication ID stored in the replication ID 211b may be any value as long as it is a unique value in the replication ID table 211. According to the state of the ring, the replication ID 211b includes the value of either a normal time replication ID 212b or a failure time replication ID 212c of the VNI corresponding to the replication switching registration table 212 described later. The replication ID stored in the replication ID 211b corresponds to reference destination information.

FIG. 10 is a configuration diagram of an example of the replication switching registration table according to the embodiment.

The replication switching registration table 212 includes columns of a VNI 212a, the normal time replication ID 212b, and the failure time replication ID 212c. The VNI 212a stores a VNI of the VLAN to be transmitted. In the normal time replication ID 212b, a replication ID which indicates a replication at the normal time is stored for the VNI of the VLAN in the same row. In the failure time replication ID 212c, a replication ID which indicates a replication at the failure time is stored for the VNI of the VLAN in the same row.

Each of the columns 212a, 212b, and 212c in the replication switching registration table 212 is registered based on the registration of the VNI in the VLAN-VNI table 214 by the administrator of the SW1. The same value as the VNI 214b in the VLAN-VNI table 214 is registered in the VNI 212a of the replication switching registration table 212. A unique value is registered in the normal time replication ID 212b and the failure time replication ID 212c in the replication switching registration table 212.

FIG. 11 is a configuration diagram of an example of the unlearned encapsulation table according to the embodiment.

The unlearned encapsulation table 213 is a table which is referred to when relaying a frame (unlearned frame) for a destination in which the relay destination is not learned as the VXLAN packet 125 or the layer 2 frame 100 as it is, and includes columns of a replication ID 213a, a destination IP address 213b, a destination MAC address 213c, and an output port 213d. The unlearned encapsulation table 213 has one or more groups of rows for each replication ID. The replication ID 213a stores a replication ID which indicates a replication. The destination IP address 213b stores an IP address to be the destination of a transmission data unit (packet or frame) in the replication in the same row (entry). The destination MAC address 213c stores a MAC address of the destination device in the replication of the entry. The output port 213d stores an ID of a port which outputs the packet or the frame in the replication of the entry. An entry whose value is registered in the destination IP address 213b and the destination MAC address 213c of the unlearned encapsulation table 213 corresponds to unlearned information, an entry associated with a failure time replication ID corresponds to failure time port information, and an entry associated with a normal time replication ID corresponds to normal time port information.

In the unlearned encapsulation table 213 of FIG. 11, a replication group in which the replication ID 213a is "id1" represents that the id2 is replicated and relayed to four transmission data units. When the values are registered in the destination IP address 213b and the destination MAC address 213c, it represents that the layer 2 frame 100 is encapsulated to a VXLAN packet and relayed, and when no value is registered in the destination IP address 213b and the destination MAC address 213b, it represents that the layer 2 frame 100 is relayed as it is.

The processing operation of the encapsulation processing unit 208 when an entry is registered in the unlearned encapsulation table 213 will be described, and in the entry, the value of the replication ID 213a is a value registered in the normal time replication ID 212b of the replication switching registration table 212.

For the VNI of the VXLAN corresponding to the replication to be processed, the encapsulation processing unit 208 registers an entry such that each IP address of the VXLAN processing unit 4 for which the administrator of the SW1 permits the relay with another VXLAN processing unit 4 is included in the destination IP address 213b. Here, it is assumed that the administrator of the SW1 stores the IP address of the VXLAN processing unit 4 in which the relay with another VXLAN processing unit 4 is permitted in the VXLAN processing unit 4 in advance for each VNI.

For example, when the replication ID 213a is "id1", the "VNI1" is specified by referring to the replication switching registration table 212 using the "id1". Here, when it is assumed that the administrator of the SW1 performs setting of the relaying of the "VNI1" between the VXLAN processing units 4 of the IP addresses "IP2" and "IP3", the IP addresses "IP2" and "IP3" stored corresponding to the "VNI1" are specified, and the "IP2" and the "IP3" are respectively set in the destination IP address 213b for different entries.

Next, the encapsulation processing unit 208 searches for the MAC address and output port corresponding to the "IP2" and the "IP3" respectively with reference to the ARP table 207, and registers the search results of the MAC address and output port in the destination MAC address 213c and output port 213d of the corresponding entry. In addition, the encapsulation processing unit 208 obtains the "VID1" corresponding to the "VNI1" corresponding to the "id1" with reference to the VLAN-VNI table 214. Further, the encapsulation processing unit 208 inquires of the layer 2 ring processing unit 203 about the port to which the "VID1" is set, and registers a port ID obtained by the inquiry in the output port 213d of the corresponding entry. The layer 2 ring processing unit 203 stores the VLANID and the port ID of the port 200 set in the VLANID in association with each other.

Accordingly, in the unlearned encapsulation table 213, when the replication ID is "id1", it is encapsulated to the VXLAN packet 125 and relayed to the destination IP addresses "IP2" and "IP3", and an entry which indicates that the layer 2 frame 100 is to be replicated and relayed to "port3" and "port4" is registered. However, in the replication, it is assumed that the layer 2 frame 100 is not relayed back to the port 200 to which the layer 2 frame 100 is input. For example, when the layer 2 frame 100 is input from the "port3", the layer 2 frame 100 is replicated and relayed only to the "port 4" without relaying back to the "port3".

Next, the processing operation of the encapsulation processing unit 208 when an entry is registered in the unlearned encapsulation table 213 will be described, and in the entry, the value of the replication ID 213a is the value registered in the failure time replication ID 212c of the replication switching registration table 212.

The encapsulation processing unit 208 specifies a replication ID (normal time replication ID) of the normal time replication ID 212b in the replication switching registration table 212 associated with a replication ID (failure time replication ID) of the replication ID 213a (associated with the same entry), and sets the entry of the failure time replication ID of the replication ID 213a in the unlearned encapsulation table 213 to be the same content as the entry of the normal time replication ID. For example, when the replication ID 213a is "id3", the values of the destination IP address 213b, the destination MAC address 213c, and the output port 213d in the entry of the unlearned encapsulation table 213 having the corresponding "id1" as the replication ID are copied to the corresponding columns of each entry in which the replication ID 213a is "id3".

Next, in the entry which indicates encapsulation to the VXLAN packet 125, when the port ID of the output port 213d is a ring port, the encapsulation processing unit 208 additionally registers, as an entry for encapsulating to the VXLAN packet 125, a new entry in which the value of the output port 213d is changed to a ring port forming a pair this ring port. Specifically, when the replication ID 213a is "id3", since there is an entry in which the "IP2", the "MAC2", and the "port2" are set in the destination IP address 213b, the destination MAC address 213c, and the output port 213c as an entry which indicates encapsulation to the VXLAN packet 125, this entry is left as it is, and a new entry in which the value of the output port 213c is changed to the "port1" forming a pair with the "port2" is additionally registered. Similarly, since there is an entry in which the "IP3", the "MAG3", and the "port1" are set in the destination IP address 213b, the destination MAC address 213c, and the output port 213c as an entry which indicates encapsulation to the VXLAN packet 125, this entry is left as it is, and a new entry in which the value of the output port 213c is changed to the "port2" forming a pair with the "port1" is additionally registered.

Accordingly, as an entry associated with the failure time replication ID, the encapsulated VXLAN packet 125 is output via a plurality of different ports (in the example, two ring ports to be paired) for the same destination IP address and the same destination MAC address.

Next, the processing operation in the SW1 will be described.

Figure 12:
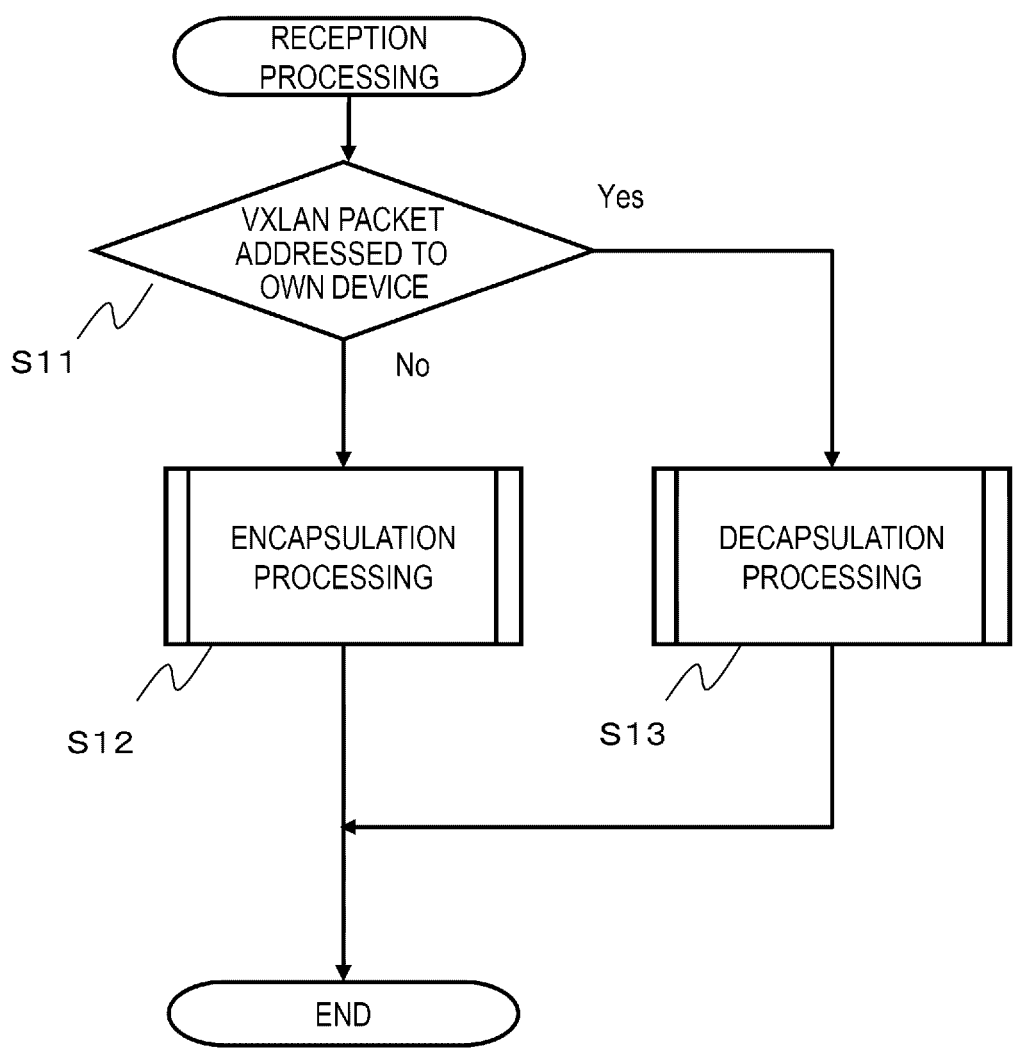
FIG. 12 is a flowchart of a reception processing according to the embodiment.

FIG. 12 is a flowchart of a reception processing according to the embodiment.

When communication data is received via the port 200, the VXLAN processing unit 4 of the SW1 determines whether the communication data is a VXLAN packet addressed to the own device (S11). Specifically, as for whether the communication data is the VXLAN packet addressed to the own device, the VXLAN processing unit 4 determines whether the communication data is a UDP/IP packet, whether the destination MAC address 113 of the packet is addressed to the own device (MAC address of SW1), whether a destination UDP port number 120 is a port number (for example, "4789") allocated to the VXLAN.

As a result, when the communication data is a VXLAN packet addressed to the own device (S11: Yes), the VXLAN processing unit 4 performs a decapsulation processing (see FIG. 14) (S13). Meanwhile, when the communication data is not a VXLAN packet addressed to the own device, that is, when the communication data is the layer 2 frame 100 or a VXLAN packet addressed to other device than the own device (S11: No), the VXLAN processing unit 4 performs an encapsulation processing (see FIG. 13) (S12).

Figure 13:
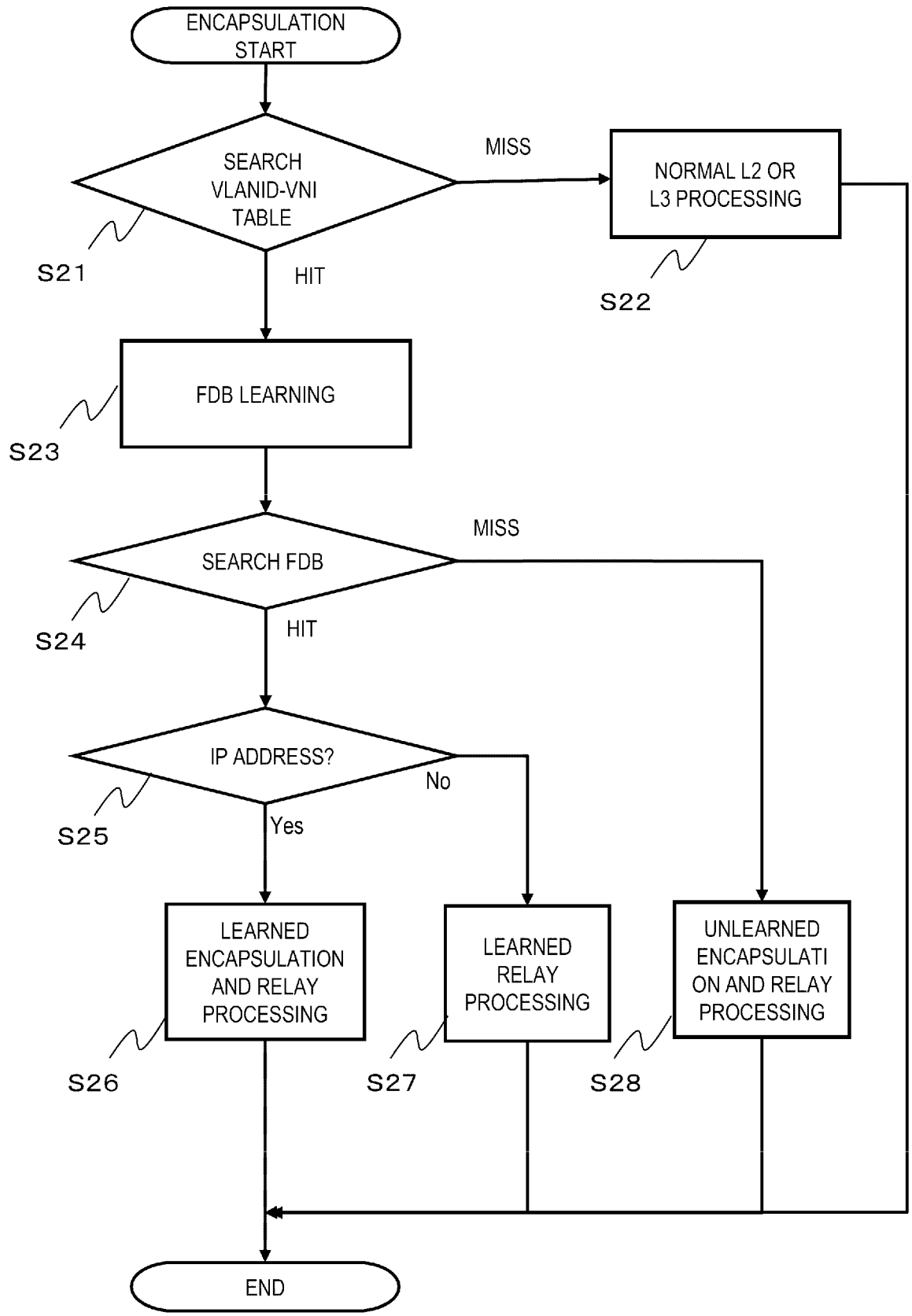
FIG. 13 is a flowchart of an encapsulation processing according to the embodiment.

FIG. 13 is a flowchart of the encapsulation processing according to the embodiment. The encapsulation processing corresponds to the processing of step S12 in FIG. 12.

The VXLAN processing unit 4 refers to a VLANID in the VLAN Tag 104 of the received data (layer 2 frame 100 or VXLAN packet 125) to search the VLAN-VNI table 214 using this VLANID (S21). As a result of this search, when the VLANID is not registered in the VLAN-VNI table 214 (S21: miss), it means that it is not the communication data for the VXLAN managed by the own device, so that the VXLAN processing unit 4 causes the layer 2 processing unit 215 or the layer 3 processing unit 216 to perform the existing layer 2 processing or layer 3 processing (S22), and ends the processing.

Meanwhile, when the VLANID is registered in the VLAN-VNI table 214 (S21: hit), the VXLAN processing unit 4 registers information of the layer 2 frame 100 in the FDB table 206 (S23: FDB table registration during the encapsulation). Specifically, the VXLAN processing unit 4 stores the transmission source MAC address 102 of the layer 2 frame 100 in the MAC address 206a, stores the VNI obtained by searching the VLAN-VNI table 214 using the VLANID in the VNI 206b, and adds, to the FDB table 206, an entry in which a port number of a port which receives the layer 2 frame 100 is stored in the output port 206d. When there is an entry having the same content in the FDB table 206, the VXLAN processing unit 4 does not add the entry to the FDB table 206. For example, when a layer 2 frame 100 in which the transmission source MAC address 102 is "MAC4" and the VLANID is "VID1"is received from the port 200 of "port2", an entry in the third row in the FDB table 206 illustrated in FIG. 7 is registered. In the entry added in the processing of step S23, nothing is registered in the destination processing unit IP address 206c.

Next, the VXLAN processing unit 4 searches the FDB table 206 (S24). Specifically, the VXLAN processing unit 4 searches whether a combination of the destination MAC address 101 of the layer 2 frame 100 and the VNI obtained by the search is registered in the FDB table 206.

As a result, when an entry of the combination of the destination MAC address 101 and the VNI is found in the FDB table 206 (S24: hit), the VXLAN processing unit 4 determines whether an IP address is set in the destination processing unit IP address 206c of the found entry (S25).

As a result, when the IP address is set in the destination processing unit IP address 206c of the found entry (S25: Yes), the VXLAN processing unit 4 performs learned encapsulation and relay processing (S26).

Here, the learned encapsulation and relay processing will be described using a case of receiving the layer 2 frame 100 as an example, in which the VLAN-VNI table 214, the FDB table 206 and the learned encapsulation table 210 are in the states illustrated in FIGS. 6 to 8, the destination MAC address 101 is "MAC2", and the VLANID in the VLAN Tag 104 is "VID1".

When the layer 2 frame 100 is received, in step S21, the VNI corresponding to "VID1" is searched as "VNI1", in step S24, the combination of "MAC2" and "VNI1" is searched from the FDB table 206, and an entry in the first row of FIG. 7 is searched, and in step S25, it is determined that "IP2" is set as the IP address in the destination processing unit IP address 206c.

In this case, the VXLAN processing unit 4 encapsulates the layer 2 frame 100 to generate the VXLAN packet 125, as described below. At this time, the VXLAN processing unit 4 searches the learned encapsulation table 210 using "IP2" set in the destination processing unit IP address 206c, sets "IP2" as a destination IP address 118 of the VXLAN packet 125, and sets the value ("MAC2") of the destination MAC address 210b of the entry in the learned encapsulation table 210 obtained by the search as the destination MAC address 113 of the VXLAN packet 125. In addition, the VXLAN processing unit 4 sets the IP address ("IP1") of the VXLAN processing unit 4 as the transmission source IP address 117 of the VXLAN packet 125, and sets the MAC address ("MAC1") of the VXLAN processing unit 4 as the transmission source MAC address 114. Further, the VXLAN processing unit 4 sets the VNI value of the search result of the VLAN-VNI table 214 as a VNI123 of the VXLAN packet 125, and sets "4789" as a destination port 120 of the VXLAN packet 125. Thereafter, the VXLAN processing unit 4 transmits the generated VXLAN packet 125 via the port 200 as an ID of the output port 210*c* of the entry in the learned encapsulation table 210.

Meanwhile, when the IP address is not set in the destination processing unit IP address 206*c* of the found entry (S25: No), the VXLAN processing unit 4 performs a learned relay processing in which the layer 2 frame 100 is transmitted via the port 200 as the ID set in the output port 206*d* of the entry (S27).

Meanwhile, in step S24, when the entry of the combination of the destination MAC address 101 and the VNI is not found in the FDB table 206 (S24: miss), the unlearned encapsulation and relay processing are performed (S28). In the unlearned encapsulation and relay processing, the VXLAN processing unit 4 replicates the layer 2 frame 100 to a plurality of layer 2 frames 100, encapsulates a part of the layer 2 frames 100 to VXLAN packets 125 and transmits the packets respectively, and transmits the remaining layer 2 frames 100 as they are.

Here, the unlearned encapsulation and relay processing will be described using a case of receiving the layer 2 frame 100 as an example, in which the VLAN-VNI table 214, the replication ID table 211, and the unlearned encapsulation table 213 are in the states illustrated in FIGS. 6, 9 and 11, the destination MAC address 101 is "MAC2", and the VLANID in the VLAN Tag 104 is "VID1". It is assumed that the entry of the combination of the destination MAC address 101 and the VNI is not found in the FDB table 206.

The VXLAN processing unit 4 refers to the replication ID table 211 using the VNI to search for the replication ID. As a result, when the replication ID ("id1") is detected (at the normal time), the VXLAN processing unit 4 uses the replication ID ("id1") to search the unlearned encapsulation table 213. Accordingly, four entries from the first to the fourth row in which the replication ID 213*a* of the unlearned encapsulation table 213 in FIG. 11 is "id1" are specified.

Next, the VXLAN processing unit 4 replicates the layer 2 frame 100. Next, the VXLAN processing unit 4 uses the entry in the first row corresponding to the destination MAC address "MAC2" to encapsulate one layer 2 frame 100 to the VXLAN packet 125 and transmits the packet from the "port2", transmits one layer 2 frame 100 from the "port3" based on the entry in the third row, and transmits one layer 2 frame 100 from the "port4" based on the entry in the fourth row.

Meanwhile, with reference to the replication ID table 211 using the VNI, the VXLAN processing unit 4 uses the replication ID ("id3") to search the unlearned encapsulation table 213 when the replication ID ("id3") is detected, that is, when immediately after the network failure occurs in the ring. Accordingly, six entries in which the replication ID 213*a* of the unlearned encapsulation table 213 in FIG. 11 is "id3" are specified.

Next, the VXLAN processing unit 4 replicates the layer 2 frame 100. Next, the VXLAN processing unit 4 uses the first entry corresponding to the destination MAC address "MAC2" to encapsulate one layer 2 frame 100 to the VXLAN packet 125 and transmits the packet from the "port2", transmits one layer 2 frame 100 from the "port3" based on the third entry, and transmits one layer 2 frame 100 from the "port4" based on the fourth entry. Further, the VXLAN processing unit 4 uses the fifth entry corresponding to the destination MAC address "MAC2" to encapsulate one layer 2 frame 100 to the VXLAN packet 125 and transmits the packet from the "port1".

As a result, the VXLAN packet 125 in which the destination IP address is set as "IP2" and the destination MAC address is set as "MAC2" can be transmitted in both directions of the "port1" and the "port2" forming a pair with "port1", which form a ring port. Accordingly, even when a part of the network 3 having a ring topology is blocked, the VXLAN packet 125 can be transmitted to a desired transmission destination device.

Figure 14:
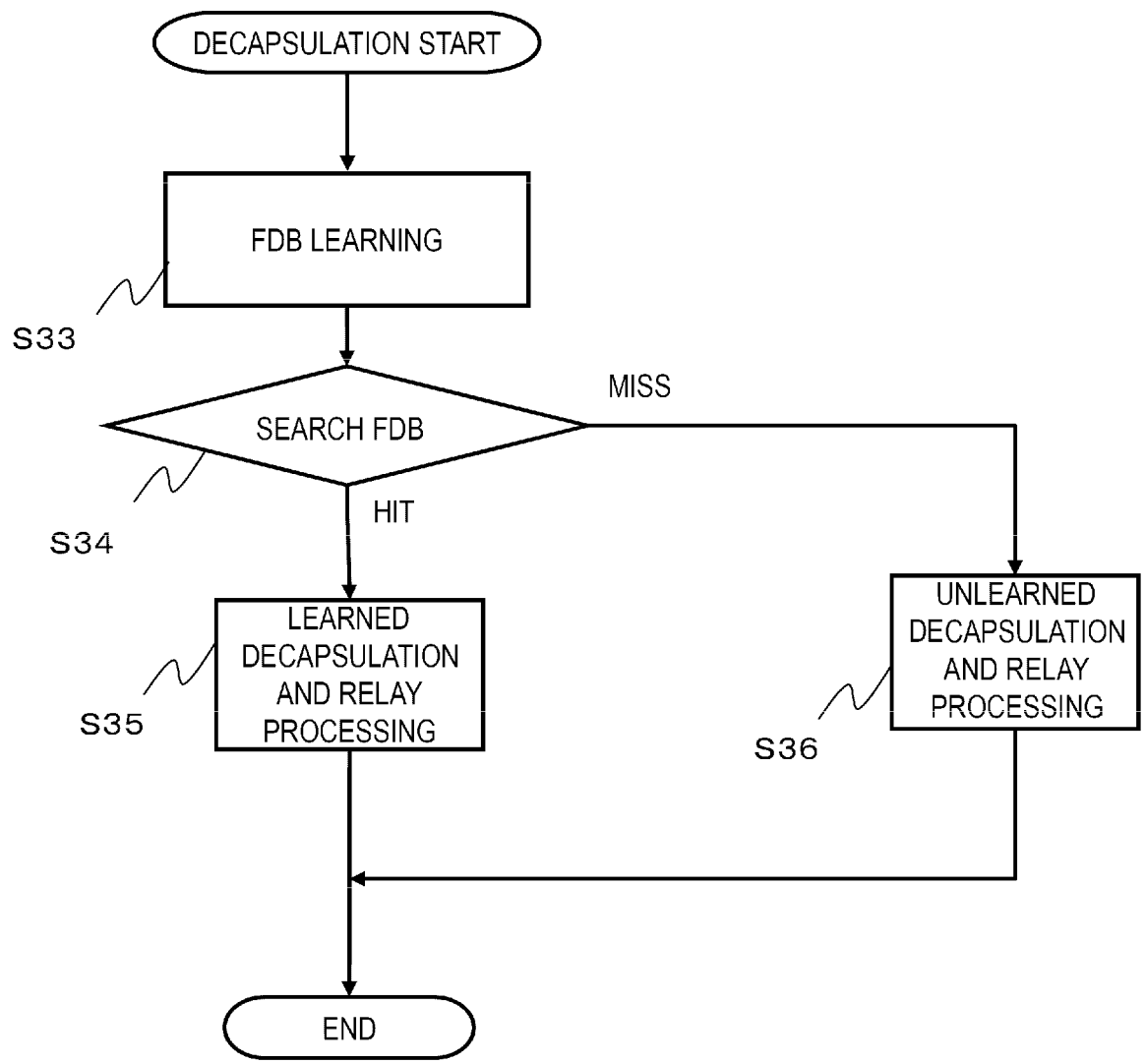
FIG. 14 is a flowchart of a decapsulation processing according to the embodiment.

FIG. 14 is a flowchart of the decapsulation processing according to the embodiment. The decapsulation processing corresponds to the processing in step S13 in FIG. 12.

The VXLAN processing unit 4 registers information of the received data (that is, the VXLAN packet 125) of the layer 2 frame 100 in the FDB table 206 (S33: FDB table registration during the decapsulation). Specifically, the VXLAN processing unit 4 stores the transmission source MAC address 114 of the VXLAN packet 125 in the MAC address 206*a*, stores the VNI123 in the VNI 206*b*, and adds, to the FDB table 206, an entry in which the destination IP address 118 is stored in the destination IP address 206*c*. When there is an entry having the same content in the FDB table 206, the VXLAN processing unit 4 does not add the entry to the FDB table 206. For example, when a VXLAN packet 125 in which the transmission source MAC address 114 is "MAC2", the VLANID is "VID1", and the transmission destination IP address is "IP2" is received, an entry in the first row of the FDB table 206 illustrated in FIG. 7 is registered. In the entry added in the processing of step S33, nothing is registered in the output port 206*d*.

Next, the VXLAN processing unit 4 searches the FDB table 206 (S34). Specifically, the VXLAN processing unit 4 searches whether the combination of the destination MAC address 101 of the VXLAN packet 125 and the VNI of the VNI123 is registered in the FDB table 206.

As a result, when the entry of the combination of the destination MAC address 101 and the VNI is found in the FDB table 206 (S34: hit), the VXLAN processing unit 4 performs learned decapsulation and relay processing (S35). Specifically, the VXLAN processing unit 4 decapsulates the VXLAN packet 125 to generate the layer 2 frame 100, and transmits the layer 2 frame 100 to the port 200 as an ID of the output port 206*d* of the found entry in the FDB table 206.

Meanwhile, when the entry of the combination of the destination MAC address 101 and the VNI is not found in the FDB table 206 (S34: miss), the VXLAN processing unit 4 performs the unlearned decapsulation and relay processing (S36).

Here, the unlearned encapsulation and relay processing will be descried using a case of receiving the VXLAN packet 125 as an example, in which the VLAN-VNI table 214, the replication ID table 211, and the unlearned encapsulation table 213 are in the states illustrated in FIGS. 6, 9 and 11, the destination MAC address 101 is "MAC2", and the VNI is "VNI1". It is assumed that the entry of the combination of the destination MAC address 101 and the VNI is not found in the FDB table 206.

The VXLAN processing unit 4 refers to the replication ID table 211 using the VNI to search for the replication ID. As a result, the VXLAN processing unit 4 uses the replication ID ("id1") to search the unlearned encapsulation table 213 when the replication ID ("id1") is detected. Accordingly, four entries from the first to the fourth row in which the replication ID 213a of the unlearned encapsulation table 213 in FIG. 11 is "id1" are specified.

Next, the VXLAN processing unit 4 decapsulates the VXLAN packet 125 to generate the layer 2 frame 100, replicates this layer 2 frame and transmits one layer 2 frame 100 from the "port3" based on the third entry in which the destination IP address 213b is not set, and transmits one layer 2 frame 100 from the "port4" based on the fourth entry.

Figure 15:
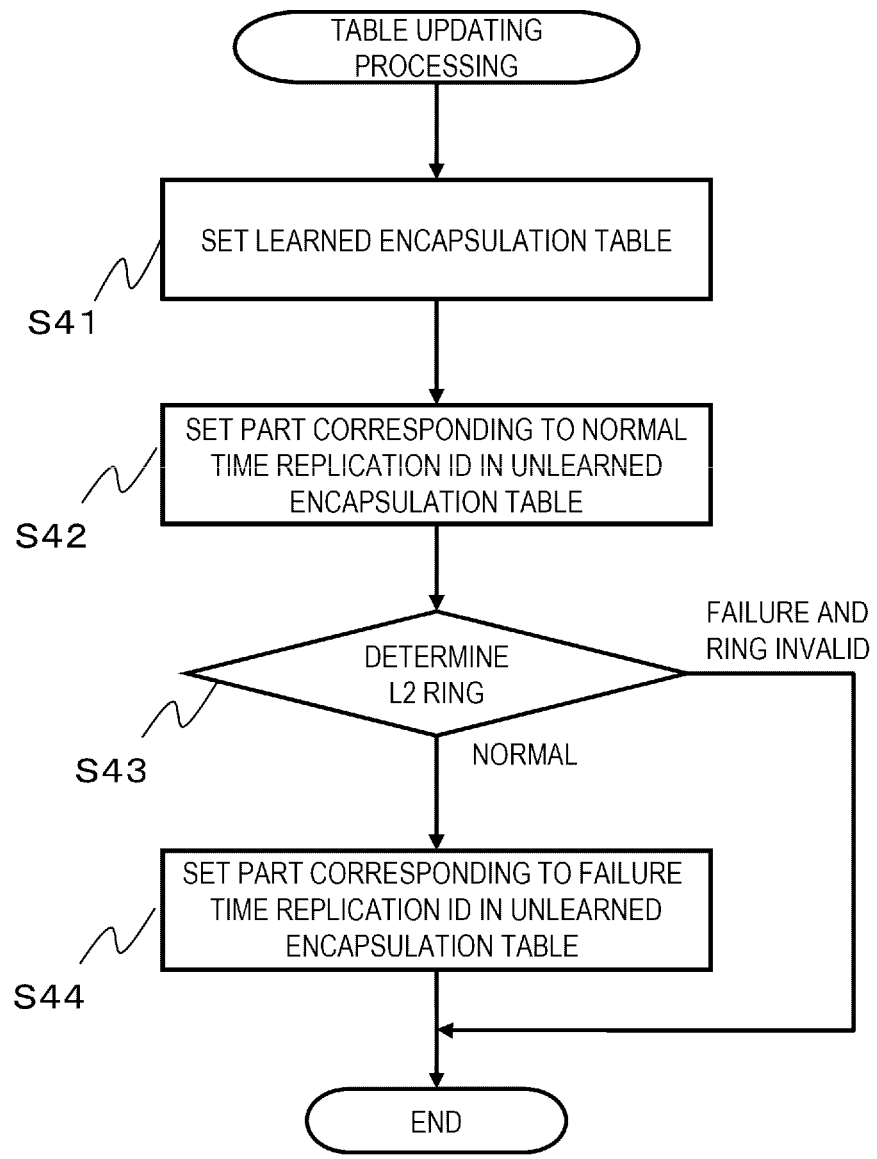
FIG. 15 is a flowchart of a table updating processing according to the embodiment.

FIG. 15 is a flowchart of a table updating processing according to the embodiment.

The table updating processing is performed when the ARP table 207 is registered or updated.

When the ARP table 207 is updated, the encapsulation processing unit 208 of the VXLAN processing unit 4 sets and updates the learned encapsulation table 210 (S41). Next, the encapsulation processing unit 208 sets and updates the entry corresponding to the normal time replication ID in the unlearned encapsulation reference table 213 (S42). Next, when the encapsulation processing unit 208 does not detect a failure in the ring network 3 by the layer 2 ring processing unit 203 (S43: normal), the encapsulation processing unit 208 sets and updates the entry corresponding to the failure time replication ID in the unlearned encapsulation table 213 (S44). Meanwhile, when a failure is detected in the ring by the layer 2 ring processing unit 203 or the layer 2 ring processing unit 203 is not operating (S43: failure, ring invalid), the encapsulation processing unit 208 ends the processing without setting and updating the entry corresponding to the failure time replication ID.

Figure 16:
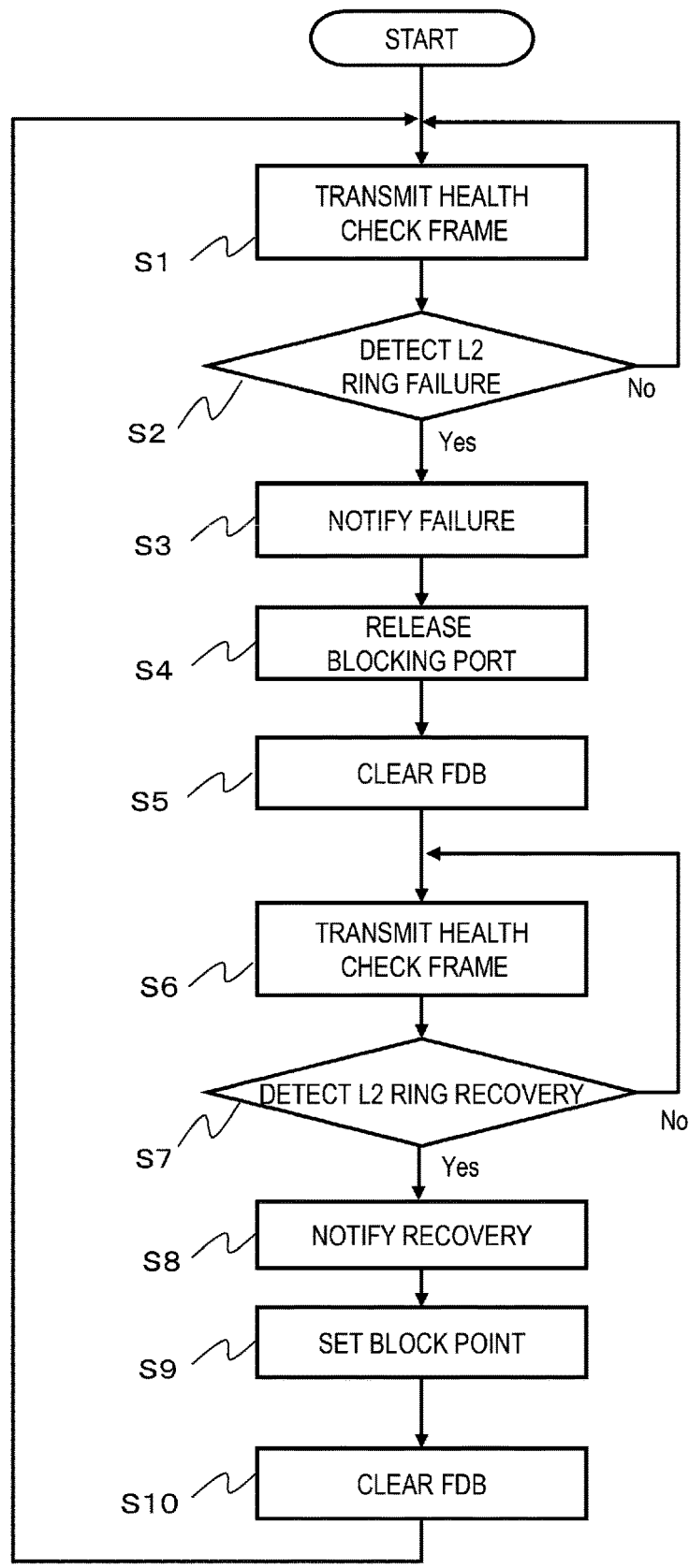
FIG. 16 is a flowchart of a failure handling processing according to the embodiment.

FIG. 16 is a flowchart of a failure handling processing according to the embodiment.

The failure handling processing is performed by the master node. For example, as illustrated in FIGS. 1A and 1B, when the network 3 having a ring topology is configured by three SW1s, the processing is performed by the SW#3 which is a master node. The failure handling processing will be described below by taking the configuration illustrated in FIG. 1B as an example.

The layer 2 ring processing unit 203 of the master node (SW#3) transmits the health check frame from both the port1 and the port2, which configure a ring, at a constant cycle, for example, a cycle of 10 ms (S1). When receiving the health check frame, the transit nodes (SW#1, SW#2) transmit the received health check frame to a ring port other than the ring port which has received the health check frame. For example, in the configuration of FIGS. 1A and 1B, when the SW#1 receives a check frame from the port1, the SW#1 transmits the check frame to the port2, and when the SW#1 receives a check frame from the port2, the SW#1 transmits the check frame to the port1.

Next, the master node (SW#3) determines whether a ring failure of the layer 2 (L2) occurs (S2). Specifically, when the health check frame transmitted by the master node returns to the master node, it is determined that the ring failure does not occur (normal state). Meanwhile, in a state where the health check frame does not return to the master node, for example, when the health check is continuously transmitted in a cycle of 10 ms, but the health check does not return to the master node even 30 ms after the last health check is received, the master node determines that the ring failure occurs.

As a result, when it is determined that a ring abnormality does not occur (S2: No), the master node proceeds the processing to step S1.

Meanwhile, when it is determined that the ring abnormality occurs (S2: Yes), the master node transmits the failure notification frame from the primary port (port1) and the secondary port (port2) (S3). After receiving the failure notification frame, the transit node performs a failure time processing (see FIG. 17).

Next, the master node releases the blocking port and enables relaying of data using the primary port (port1) and the secondary port (port2) (S4). Next, the master node clears the FDB table 206 (clears the entry in the FDB table 206: the same applies) (S5), and starts performing the failure time processing (see FIG. 17) described later.

Next, the master node transmits the health check frame from both the port1 and the port2 which configure a ring again at a constant cycle, for example, the cycle of 10 ms (S6). Next, it is determined whether the master node recovers from the failure state (S7).

As a result, when it is determined that the master node does not recover from the failure state, that is, when the health check frame does not return (S7: No), the master node proceeds the processing to step S6.

Meanwhile, when it is determined that the master node recovers from the failure state (S7: Yes), the master node transmits a failure recovery notification frame from the port1 and the port2 (S8). After receiving the failure recovery notification frame, the transit node clears the FDB table 206. Accordingly, the path information learned during the failure can be cleared.

Next, the master node sets a block point to the port2 (S9), clears the path information during the failure by clearing the FDB table 206 (S10), and proceeds the processing to step S1.

Figure 17:
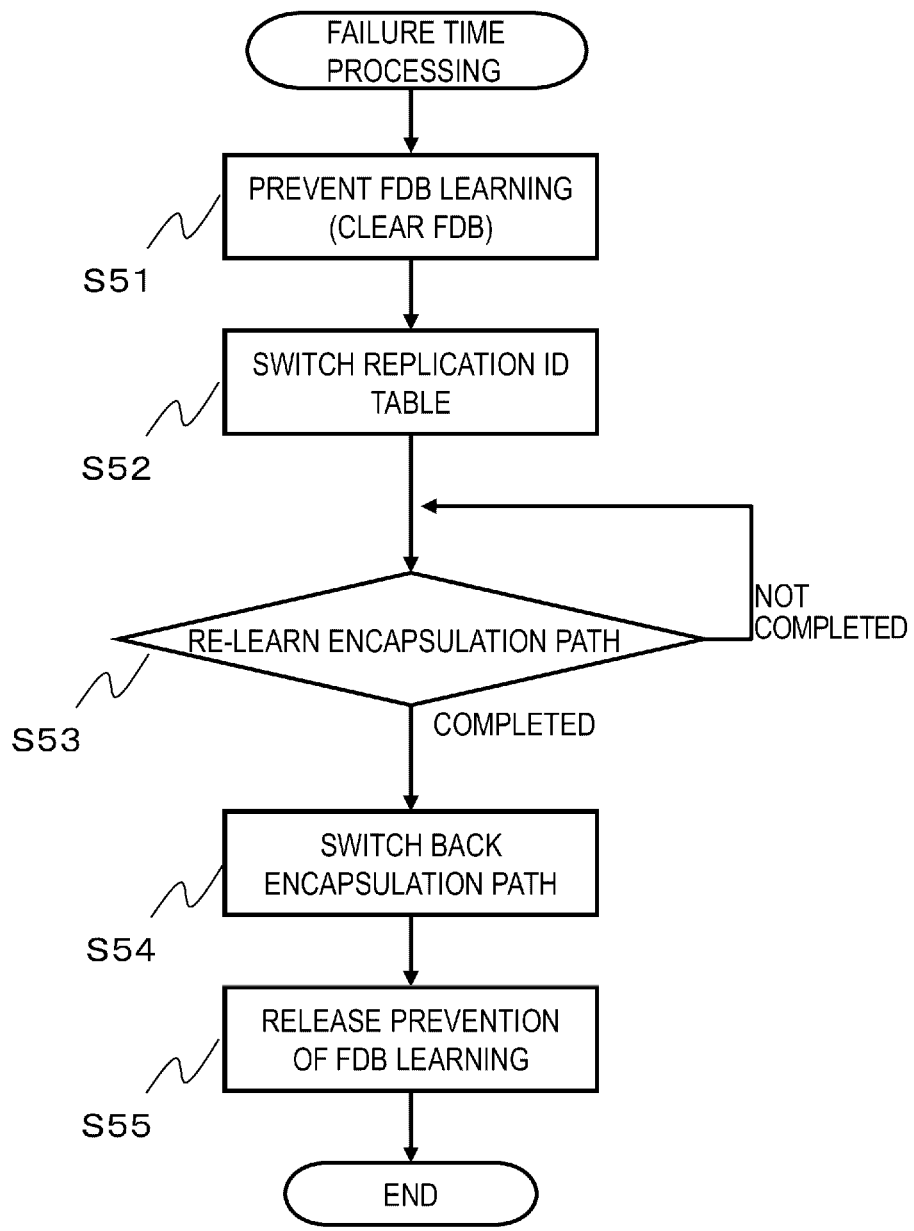
FIG. 17 is a flowchart of a failure time processing according to the embodiment.

FIG. 17 is a flowchart of the failure time processing according to the embodiment.

The failure time processing is performed by the master node in step S5 of the failure handling processing, and is performed by the transit node when the failure notification frame is received.

First, the encapsulation processing unit 208 of the SW1 clears the FDB table 206 to prevent the learning of the FDB table 206 (S51). By clearing the FDB table 206, it is possible to delete the path information in a state where the failure does not occur, and to perform relaying of the communication data in a path where transmission is not performed when the failure occurs. For example, in the normal state of FIG. 1A, when the terminal A communicates with the terminal C, communication is performed from the SW#1 via the SW#2, while in the failure state of FIG. 1B, relaying cannot be performed from the SW#1 to the SW#2, but communication can be performed via the SW#1 to the SW#3, then to the SW#2.

By preventing the learning of the FDB table 206 only for the VXLAN packet from the opposing (directly connected) VXLAN processing unit 4, the learning of the FDB table 206 for communication data with other devices may not be prevented. In this way, after clearing the FDB table 206 by a communication failure in the ring, only learning of the packet from the opposing VXLAN processing unit 4 is prevented, and the MAC address of the device (terminal 2) connected under the own VXLAN processing unit 4 is learned, so that communication between the terminals 2 under the own VXLAN processing unit 4 can be learned, and the unlearned encapsulation and relay processing (S28) can be performed only for communication with the opposing VXLAN processing unit 4. That is, it is possible to prevent processing of relaying data by unnecessary replication rather than preventing the learning of the FDB table 206 for all.

Next, the encapsulation processing unit 208 rewrites the replication ID of the replication ID 211b in the replication ID table 211 into the replication ID (failure time replication ID) of the failure time replication ID 212c in the replication switching registration table 212 (S52). Accordingly, in the unlearned encapsulation and relay processing (S28), the VXLAN packet 125, which is transmitted to a layer 3 relay path ARP-resolved by the ARP table 207 before the failure occurs, can be added to the layer 3 relay path and can be transmitted to the ports forming a ring port. That is, the relay operation of the layer 3 can be temporarily made similar to that of the layer 2. By performing this step, the communication of the VXLAN packet is recovered. The processing time required for rewriting the replication ID in this step can be limited to the read time for the replication ID registered in the failure time replication ID 212c in the replication switching registration table 212 and the write time of the replication ID to the replication ID 211b in the replication ID table 211, and is a relatively short time. The corresponding relationship between the normal time replication ID and the failure time replication ID is always fixed. For example, the value of the normal time replication ID is 1 to 4,000, and the value of the failure time replication ID is 10,001 to 14,000. If it is decided to correspond to each replication ID in an ascending order, the processing time required for rewriting the replication ID can be limited to only the write time of the failure time replication ID in the replication ID 211b in the replication ID table 211.

Next, the encapsulation processing unit 208 determines whether re-learning of an encapsulation path is completed (S53), that is, whether re-learning of the ARP table 207 when the failure occurs, and update of the entries corresponding to the learned encapsulation table 210 and the normal time replication ID of the unlearned encapsulation table 213 are all completed. As a result, when the re-learning of the encapsulation path is not completed (S53: not complete), the encapsulation processing unit 208 proceeds the processing to step S53 and waits until the re-learning is completed.

Meanwhile, when the re-learning of the encapsulation path is completed (S53: complete), the encapsulation processing unit 208 rewrites the replication ID of the replication ID table 211 into the normal time replication ID (S54). Accordingly, the switching of the relay path of the layer 3 is completed according to the failure of the layer 2.

Next, the encapsulation processing unit 208 releases the prevention of the learning of the FDB table 206 (S55), and ends the processing. Accordingly, the operation in which the encapsulation to the VXLAN packet after the reception of the failure notification frame is limited to only the unlearned encapsulation and relay processing (S28) can be performed such that the learned encapsulation and relay processing (S26) can also be operated.

The invention is not limited to the above embodiment, and can be appropriately modified and implemented without departing from the spirit of the invention.

For example, in the above embodiment, in step S51 of the failure time processing, the entire path information (all entries) in the FDB table 206 is cleared to shorten the processing time for clearing, but the invention is not limited to this, for example, only the entry related to the transmission of the VXLAN packet in the FDB table 206 (that is, the entry in which the IP address is set) may be cleared. In this way, with regard to communication data other than the VXLAN packet, it is possible to prevent unnecessary processing related to data replication and relaying by using the path information as it is before the failure occurs.

In addition, in the above embodiment, part or all of the processing performed by the FDB control unit 201, the VXLAN processing unit 4, the layer 2 ring processing unit 203, the ARP control unit 205, the layer 2 processing unit 215, and the layer 3 processing unit 216 may be realized by the CPU 204 performing a program. This program may be installed from a program source. The program source may be a program distribution server or storage medium (for example, portable storage medium).

What is claimed is:

1. A network relay device capable of generating a layer 3 packet from a received layer 2 frame and transmitting the generated layer 3 packet, the network relay device comprising:
   a plurality of ports which is capable of transmitting and receiving data;
   a storage device; and
   a processor communicatively coupled to the plurality of ports and the storage device, wherein the processor configured to:
   detect a failure of a network connected via the ports;
   generates a plurality of layer 3 packets from one layer 2 frame received via the ports when the failure of the network is detected, and transmit the generated plurality of layer 3 packets to a network via the plurality of ports,
   learn a port via which the layer 3 packet should be output to each destination when the failure of the network occurs, and store the port as layer 3 packet path information,
   generate one layer 3 packet from one received layer 2 frame, specify the port via which the layer 3 packet should be output based on the layer 3 packet path information, and transmit the generated layer 3 packet to the specified port when learning of the layer 3 packet path information is completed,
   learn an IP address corresponding to a MAC address based on the received layer 2 frame, and store the IP address as transmission destination address information,
   specify a port corresponding to the IP address which is learned based on the layer 3 packet path information when an IP address of a transmission destination of the received layer 2 frame is learned in the transmission destination address information,
   prevent learning of the IP address when the failure is detected,
   release the prevention of the learning of the IP address when the learning of the layer 3 packet path information is completed,
   delete a learning content of the transmission destination address information when the failure is detected,
   detect a recovery from the failure of the network, and delete the learning content of the transmission destination address information when the recovery from the failure is detected,
   store unlearned information which indicates the port via which the layer 3 packet should be output when the IP address of the transmission destination of the layer 2 frame is not learned in the transmission destination address information,
   perform transmission via the port via which the layer 3 packet should be output based on the unlearned information when the IP address of the transmission destination of the received layer 2 frame is not learned,
   wherein the unlearned information includes failure time port information which indicates a plurality of ports via which the layer 3 packet should be output when a failure occurs in the network, and normal time port information which indicates a port via which the layer 3 packet should be output at other times, perform transmission to a plurality of ports via which the layer 3 packet should be output based on the failure time port information when the failure of the network is detected and when the IP address of the transmission destination of the received layer 2 frame is not learned, store, via the storage device, reference destination information which indicates any one of the failure time port information and the normal time port information in the unlearned information, use the reference destination information to refer to the failure time port information or the normal time port information from the unlearned information, and set the reference destination information which indicates the failure time port information as the reference destination information when the failure of the network is detected.

2. The network relay device according to claim 1, wherein the network relay device is connected to another network relay device to configure a ring network, the processor detects a failure of the ring network, and the processor generates two layer 3 packets from one layer 2 frame received via the port, and transmits the two generated layer 3 packets via two ports connected to other two network relay devices which configure the ring network.

3. A network relay method to be performed by a network relay device capable of generating a layer 3 packet from a received layer 2 frame and transmitting the generated layer 3 packet, and the network relay device including a plurality of ports which is capable of transmitting and receiving data, the network relay method comprising:

detecting, via a processor, a failure of a network connected via the port;

generating, via the processor, a plurality of layer 3 packets from one layer 2 frame received via the port when the failure of the network is detected;

transmitting, via the processor, the generated plurality of layer 3 packets to the network via the plurality of ports;

learning, via the processor, a port via which the layer 3 packet should be output to each destination when the failure of the network occurs, and storing, via a storage device, the port as layer 3 packet path information;

generating, via the processor, one layer 3 packet from one received layer 2 frame, specify the port via which the layer 3 packet should be output based on the layer 3 packet path information, and transmitting the generated layer 3 packet to the specified port when learning of the layer 3 packet path information is completed;

learning, via the processor, an IP address corresponding to a MAC address based on the received layer 2 frame, and storing, via the storage device, the IP address as transmission destination address information;

specifying, via the processor, a port corresponding to the IP address which is learned based on the layer 3 packet path information when an IP address of a transmission destination of the received layer 2 frame is learned in the transmission destination address information;

preventing, via the processor, learning of the IP address when the failure is detected;

releasing, via the processor, the prevention of the learning of the IP address when the learning of the layer 3 packet path information is completed;

deleting, via the processor, a learning content of the transmission destination address information when the failure is detected;

detecting, via the processor, a recovery from the failure of the network, and delete the learning content of the transmission destination address information when the recovery from the failure is detected;

storing, via the storage device, unlearned information which indicates the port via which the layer 3 packet should be output when the IP address of the transmission destination of the layer 2 frame is not learned in the transmission destination address information;

performing transmission via the port via which the layer 3 packet should be output based on the unlearned information when the IP address of the transmission destination of the received layer 2 frame is not learned;

wherein the unlearned information includes failure time port information which indicates a plurality of ports via which the layer 3 packet should be output when a failure occurs in the network, and normal time port information which indicates a port via which the layer 3 packet should be output at other times, performing transmission to a plurality of ports via which the layer 3 packet should be output based on the failure time port information when the failure of the network is detected and when the IP address of the transmission destination of the received layer 2 frame is not learned;

storing, via the storage device, reference destination information which indicates any one of the failure time port information and the normal time port information in the unlearned information;

using the reference destination information to refer to the failure time port information or the normal time port information from the unlearned information; and setting, via the processor, the reference destination information which indicates the failure time port information as the reference destination information when the failure of the network is detected.

4. A non-transitory computer-readable medium storing instructions within which, when executed by a processor, cause the processor to execute a network relay program to be performed by a computer which configures a network relay device capable of generating a layer 3 packet from a received layer 2 frame and transmitting the generated layer 3 packet, and the computer including a plurality of ports which is capable of transmitting and receiving data, the network relay program comprising:

detecting a failure of a network connected via the port;

generating a plurality of layer 3 packets from one layer 2 frame received via the port when the failure of the network is detected, and transmits the generated plurality of layer 3 packets to the network via the plurality of ports;

learning a port via which the layer 3 packet should be output to each destination when the failure of the network occurs, and storing, via a storage device, the port as layer 3 packet path information;

generating one layer 3 packet from one received layer 2 frame, specify the port via which the layer 3 packet should be output based on the layer 3 packet path information, and transmitting the generated layer 3 packet to the specified port when learning of the layer 3 packet path information is completed;

learning an IP address corresponding to a MAC address based on the received layer 2 frame, and storing the IP address as transmission destination address information;

specifying a port corresponding to the IP address which is learned based on the layer 3 packet path information when an IP address of a transmission destination of the received layer 2 frame is learned in the transmission destination address information;

preventing learning of the IP address when the failure is detected;

releasing the prevention of the learning of the IP address when the learning of the layer 3 packet path information is completed;

deleting a learning content of the transmission destination address information when the failure is detected;

detecting a recovery from the failure of the network, and delete the learning content of the transmission destination address information when the recovery from the failure is detected;

storing, via the storage device, unlearned information which indicates the port via which the layer 3 packet should be output when the IP address of the transmission destination of the layer 2 frame is not learned in the transmission destination address information;

performing transmission via the port via which the layer 3 packet should be output based on the unlearned information when the IP address of the transmission destination of the received layer 2 frame is not learned;

wherein the unlearned information includes failure time port information which indicates a plurality of ports via which the layer 3 packet should be output when a failure occurs in the network, and normal time port information which indicates a port via which the layer 3 packet should be output at other times, performing transmission to a plurality of ports via which the layer 3 packet should be output based on the failure time port information when the failure of the network is detected and when the IP address of the transmission destination of the received layer 2 frame is not learned;

storing, via the storage device, reference destination information which indicates any one of the failure time port information and the normal time port information in the unlearned information;

using the reference destination information to refer to the failure time port information or the normal time port information from the unlearned information; and setting the reference destination information which indicates the failure time port information as the reference destination information when the failure of the network is detected.

* * * * *